E. H. LUDEMAN.
FLEXIBLE SHAFT COUPLING.
APPLICATION FILED FEB. 6, 1917.
1,246,445.
Patented Nov. 13, 1917.
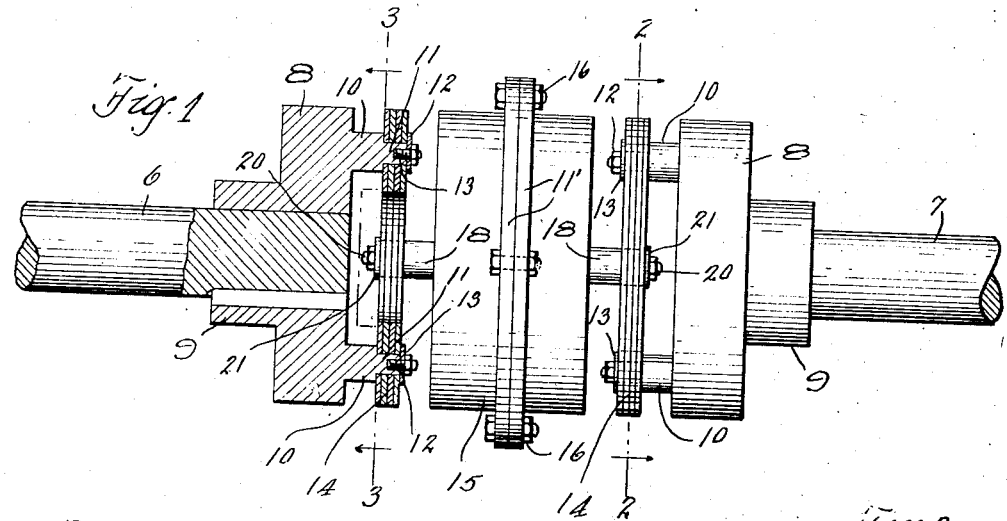
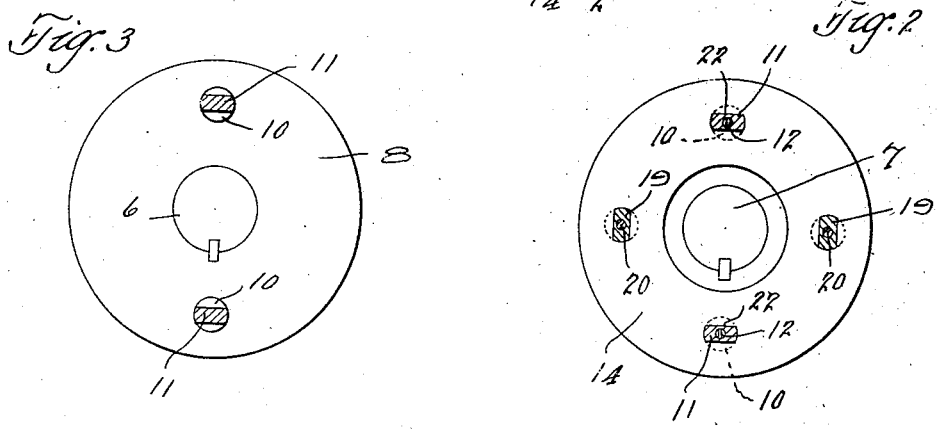
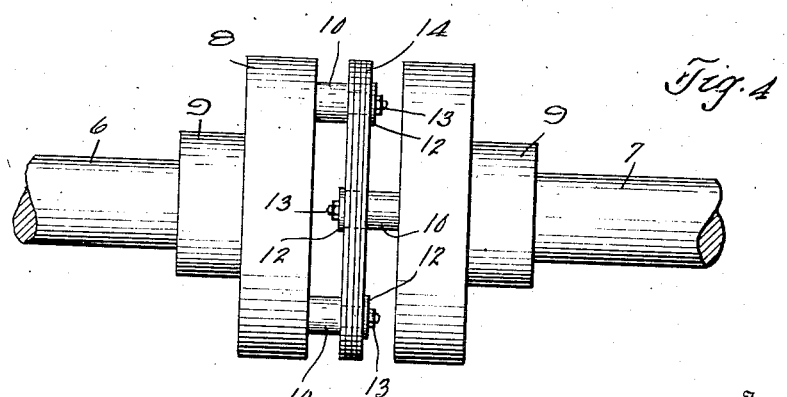
Inventor
E. H. Ludeman
By
Attorney

UNITED STATES PATENT OFFICE.

EDWIN H. LUDEMAN, OF NEW YORK, N. Y.

FLEXIBLE SHAFT-COUPLING.

1,246,445.  Specification of Letters Patent.  Patented Nov. 13, 1917.

Application filed February 6, 1917. Serial No. 146,936.

*To all whom it may concern:*

Be it known that I, EDWIN H. LUDEMAN, a citizen of the United States, residing at New York, in the county of New York and State of New York, have invented certain new and useful Improvements in Flexible Shaft-Couplings, of which the following is a specification.

This invention relates to flexible shaft couplings, and particularly to a coupling which will permit relative angular movement of the shaft sections, and also variations or lateral off-set of the shafts with respect to each other, such as often occurs in consequence of unequal expansion or other change of position of the two shaft sections or of the machines of which they form parts or to which they are connected.

The invention is a modification or improvement of the flexible coupling shown in the patent to Thomas, No. 1188113, and has for its object to simplify and improve such a coupling, as well as to cheapen the cost of construction thereof, with respect both to material and labor of assembling. By means of the present invention castings or forgings may be used and a large amount of machine work is avoided, and the resulting coupling also has advantages with respect to strength, and a saving of all-over length, as it is desirable to set the shaft sections as near together as possible. The device includes laminated rings, as in said patent, adapted to transmit the motion and sustain the torque, permitting at the same time the variations referred to.

The invention is illustrated in the accompanying drawing, in which Figure 1 is a side elevation, partly in section, of the coupling. Fig. 2 is a section on the line 2—2 of Fig. 1. Fig. 3 is a section on the line 3—3 of Fig. 1. Fig. 4 is a side elevation of a modification.

Referring specifically to the drawings, the two shaft sections are indicated at 6 and 7, one of which will be the driver and the other the driven shaft. Each shaft section has a head 8 keyed or otherwise secured thereto, the head having preferably an extended hub 9, for the sake of strength.

On its inner face each head has a plurality of spaced lugs or bosses 10 which are preferably integral with the head and which are spaced at equal distances in a line concentric with the axis of the shaft. The drawing shows two of these bosses on each head, located diametrically opposite to each other. Each boss has on its face a flattened or truncated extension 11, the long axis of which is preferably at a tangent to the circle, as shown in Fig. 2, and this projection is tapped to receive a screw 12 which holds a washer 13 which confines the laminated ring 14.

The central member 15 of the coupling comprises a circular block which may be made in one piece, or, as shown in the drawing, in halves fastened together by bolts 16 extending through flanges 11 on the respective halves. Whether made in one or more pieces, this central member has on the opposite faces thereof a plurality of bosses 18, preferably integral therewith, and corresponding in number and position to the bosses 10 on the heads. The bosses 18 are provided with extensions 19 similar in arrangement and shape to the extensions 11, as well as with screws 20 and washers 21, to hold the rings 14.

Each ring consists of a plurality of plates, and has punched or other openings 22 of proper shape and location to receive the extensions 11 and 19 on the heads and intermediate member respectively, being thereby alternately connected to the same. The number of points of connection may be varied as desired, four points being shown in the drawings, connecting the rings at quarters.

By the arrangement shown and described the rings will yield or may be distorted between the connecting points to permit angular variations of the shaft section, and the use of the intermediate coupling member permits lateral shift or off set of the shafts, with their axes parallel or otherwise; and in any position the rotary movement will be transmitted without danger of crystallization of the spring rings. The assembly is very easy, since the coupling may be disconnected by removing the screws 12 and 20, and the torque is taken by integral parts of the associated members.

In the modified form shown in Fig. 4 the central member is omitted, and the heads on the shaft sections are connected to each other by means of a laminated ring attached to the respective heads in the same manner as above described, that is by means of integral bosses having extensions fitting in holes in the rings and held by screws and washers.

I claim:

1. In a flexible shaft coupling, the combination of heads adapted to be attached to adjacent shaft sections, said heads having integral bosses projecting on their opposing faces, and a flexible ring connected between the heads and spaced therefrom by the bosses and having openings into which the ends of the bosses project.

2. In a flexible shaft coupling, the combination of heads adapted to be attached to adjacent shaft sections, an intermediate member between the heads, said member and heads having bosses, on their opposed faces, with reduced extensions at their outer ends, laminated flexible rings between the heads and said member, said rings having openings into which said extensions project, and means to clamp said rings against said bosses.

3. In a flexible shaft coupling, the combination of shaft heads, a member between said heads, said member and heads having integral bosses, on their opposed faces with reduced extensions at their outer ends forming shoulders extending on tangential lines, flexible rings between the heads and said member, said rings having openings into which said extensions project, and means to clamp said rings against said shoulders.

In testimony whereof, I affix my signature in presence of two witnesses.

EDWIN H. LUDEMAN.

Witnesses:
 MARIE A. RITTER,
 DAVID H. REID.